United States Patent
Seo et al.

(10) Patent No.: US 11,238,630 B2
(45) Date of Patent: Feb. 1, 2022

(54) ELECTRONIC DEVICE FOR GENERATING AN IMAGE BASED ON A STYLE OF ANOTHER IMAGE AND CONTROL METHOD THEREOF

(71) Applicant: SAMSUNG ELECTRONICS CO., LTD., Suwon-si (KR)

(72) Inventors: Yoo-jin Seo, Suwon-si (KR); Jeong-rok Jang, Suwon-si (KR); Kwan-sik Yang, Suwon-si (KR); Jaehwang Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/810,062

(22) Filed: Mar. 5, 2020

(65) Prior Publication Data

US 2020/0286275 A1    Sep. 10, 2020

(30) Foreign Application Priority Data

Mar. 5, 2019    (KR) ........................ 10-2019-0025161

(51) Int. Cl.
  *G06T 11/60*    (2006.01)
  *G06T 7/90*    (2017.01)
(52) U.S. Cl.
  CPC ................ *G06T 11/60* (2013.01); *G06T 7/90* (2017.01); *G06T 2207/20081* (2013.01)
(58) Field of Classification Search
  None
  See application file for complete search history.

(56) References Cited

U.S. PATENT DOCUMENTS 10,832,387 B2 * 11/2020 Hu ............................ G06T 5/50
2017/0139572 A1 * 5/2017 Sunkavalli .......... G06F 3/04842
(Continued)

FOREIGN PATENT DOCUMENTS

JP    2018-132855    8/2018
KR    10-1763132    7/2017
(Continued)

OTHER PUBLICATIONS

Search Report dated Jul. 2, 2020 in counterpart International Patent Application No. PCT/KR2020/003054.

*Primary Examiner* — Jason A Pringle-Parker
(74) *Attorney, Agent, or Firm* — Nixon & Vanderhye P.C.

(57) ABSTRACT

Provided is an electronic device. The electronic device includes: a communicator comprising communication circuitry configured to establish communication with an external device; a display configured to display a first image and a second image; a processor; and a memory, wherein the memory stores instructions which, when executed, cause the processor to control the electronic device to: acquire a feature of the first image and a feature of the second image; and identify a learning model to be applied to the first image and the second image from among a first learning model included in the electronic device and a second learning model included in a server in communication with the electronic device through the communicator, based on at least one of the feature of the first image or the feature of the second image, wherein the first learning model and the second learning model are configured to convert the first image into a style of the second image to acquire a third image.

18 Claims, 12 Drawing Sheets

(56) References Cited

U.S. PATENT DOCUMENTS

| | | | | |
|---|---|---|---|---|
| 2018/0108132 A1* | 4/2018 | Flamm | .................... | G06T 7/11 |
| 2018/0158224 A1* | 6/2018 | Bethge | .................... | G06T 11/60 |
| 2018/0357800 A1* | 12/2018 | Oxholm | ................. | G06N 3/084 |
| 2019/0108417 A1* | 4/2019 | Talagala | ................ | G06K 9/6262 |
| 2020/0082249 A1* | 3/2020 | Hua | ...................... | G06T 11/001 |
| 2020/0242823 A1* | 7/2020 | Gehlaut | .................. | G06T 11/60 |

FOREIGN PATENT DOCUMENTS

| | | |
|---|---|---|
| WO | 2018/111786 | 6/2018 |
| WO | 2018/194863 | 10/2018 |

* cited by examiner

ELECTRONIC DEVICE FOR GENERATING AN IMAGE BASED ON A STYLE OF ANOTHER IMAGE AND CONTROL METHOD THEREOF

CROSS-REFERENCE TO RELATED APPLICATION

This application is based on and claims priority under 35 U.S.C. § 119 to Korean Patent Application No. 10-2019-0025161, filed on Mar. 5, 2019 in the Korean Intellectual Property Office, the disclosure of which is incorporated by reference herein in its entirety.

BACKGROUND

1. Field

The disclosure relates to a method in which an electronic device converts an image using a plurality of images.

2. Description of Related Art

Various methods for generating new images by correcting or converting images are known. A new image is generated by extracting edge components from an image or by extracting predetermined color values included in an image to change the predetermined color values to other color values.

As one of various methods for correcting images, an algorithm for converting an A image into a C image by referring to colors, saturations, etc. included in a B image is known. For example, the algorithm includes a method of applying the color values and saturation values of the B image to the A image while maintaining the main edge components of the A image to thereby generate the C image.

Recently, methods for generating the C image using an artificial intelligent algorithm (or a learning model) are proposed.

SUMMARY

Embodiments of the disclosure provide an electronic device for selecting, when generating a new image using a plurality of images, a learning model for generating the new image based on features of the plurality of images, and a method of controlling the electronic device.

Additional aspects of the disclosure will be set forth in part in the description which follows and, in part, will be apparent from the description.

In accordance with an example embodiment of the disclosure, an electronic device includes: a communicator comprising communication circuitry configured to establish communication with an external device; a display configured to display a first image and a second image; a processor; and a memory, wherein the memory stores a plurality of instructions which, when executed, cause the processor to control the electronic device to: acquire a feature of the first image and a feature of the second image; and identify a learning model to be applied to the first image and the second image from among a plurality of learning models, the plurality of learning models including a first learning model included in the electronic device and a second learning model included in a server in communication with the electronic device through the communicator, based on at least one of the feature of the first image or the feature of the second image, wherein the plurality of learning models are configured to convert the first image into a style of the second image to acquire a third image.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
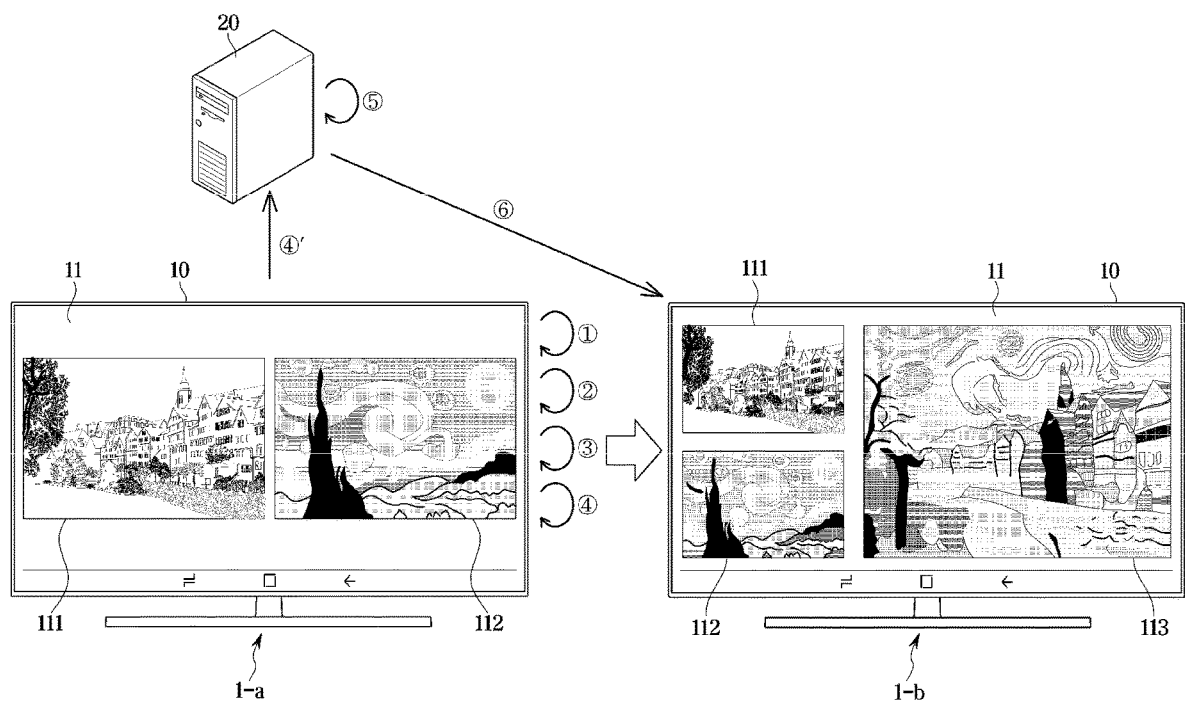
FIG. 1 is a diagram illustrating an example in which an electronic device acquires a new image using a plurality of images according to an embodiment of the disclosure.

Hereinafter, terms used in the disclosure will be briefly described, and the disclosure will be described in greater detail.

Although general terms being widely used in the disclosure while considering the functions of the disclosure may be used, they may vary according to intentions of one of ordinary skill in the art, judicial precedents, the advent of new technologies, and the like. Terms arbitrarily selected may also be used in a specific case. In this case, their meanings are provided in the detailed description. Hence, the terms must be defined based on the meanings of the terms and the contents of the entire disclosure, not by simply stating the terms themselves.

While the various example embodiments of the disclosure are susceptible to various modifications and alternative forms, specific embodiments thereof are illustrated by way of example in the drawings and will herein be described in greater detail. It should be understood, however, that there is no intent to limit the disclosure to the particular forms disclosed, but instead, the disclosure is understood to cover all modifications, equivalents, and alternatives falling within the spirit and scope of the disclosure. In the following description, if it is determined that detailed descriptions of related art unnecessarily obscure the subject matter of the disclosure, the detailed descriptions may be omitted.

It will be understood that, although the terms first, second, etc. may be used herein to describe various components, these components should not be limited by these terms. These terms are used simply to distinguish one component from another.

Throughout the disclosure, a singular form may include plural forms, unless there is a particular description contrary thereto. In the disclosure, it is to be understood that the terms such as "including" or "configured," etc., are intended to indicate the existence of the components, features, numbers, steps, operations, or combinations thereof disclosed in the disclosure, and are not intended to preclude the possibility that one or more other components, features, numbers, steps, operations, or combinations thereof may exist or may be added.

As used herein, the terms 'module', or 'portion' may perform at least one function or operation, and may be implemented as hardware, software, or a combination of hardware and software. Also, a plurality of 'modules' or a plurality of 'portions' may be integrated into at least one module and implemented as at least one processor, except for a 'module' or 'portion' that may need to be implemented as specific hardware.

In the various example embodiments of the disclosure, it will be understood that the case in which a certain portion is "connected" to another portion includes the case in which the portion is "electrically connected" to the other portion with an intervening component, as well as the case in which the portion is "directly connected" to the other portion. Also, the connection may include a wireless connection as well as a physical connection. Also, it will be understood that when a certain portion "includes" a certain component, the portion does not exclude another component but can further include another component, unless the context clearly dictates otherwise.

Hereinafter, example embodiments of the disclosure will be described in greater detail with reference to the accompanying drawings. The disclosure may, however, be embodied in many different forms and should not be understood as being limited to the embodiments set forth herein. In the drawings, similar portions are assigned similar reference numerals.

Meanwhile, in the disclosure, the term "person" or "user" may refer, for example, to an owner or user of an electronic device.

Throughout the disclosure, the expression "at least one of a, b or c" indicates only a, only b, only c, both a and b, both a and c, both b and c, all of a, b, and c, or variations thereof.

FIG. 1 is a diagram illustrating an example in which an electronic device acquires a new image using a plurality of images according to an embodiment of the disclosure.

Referring to FIG. 1, an electronic device 10 may be an image display (e.g., a television (TV)) capable of processing an image signal received from outside to generate an image and visually displaying the image. However, the electronic device 10 is not limited to a TV, and may be implemented as a device including a memory and a processor. For example, the electronic device 10 may include, for example, and without limitation, at least one of a smart phone, a tablet PC, a mobile phone, a video phone, an e-book reader, a desktop PC, a laptop PC, a netbook computer, a workstation, a server, personal digital assistant (PDA), portable multimedia player (PMP), a MP3 player, medical equipment, a camera, a wearable device, or the like. The wearable device may include, for example, and without limitation, at least one of an accessory type (e.g., a watch, a ring, a bracelet, an ankle bracelet, a necklace, glasses, contact lenses, or a head-mounted-device (HMD)), a fabric or clothes integration type (e.g., electronic clothes), a body attachment type (e.g., a skin pad or a tattoo), a body implantable circuit, or the like. As various embodiments of the disclosure, the electronic device 10 may include, for example, and without limitation, at least one of a digital video display (DVD) player, an audio system, a refrigerator, an air conditioner, a cleaner, an oven, a microwave, a washing machine, an air cleaner, a set-top box, a home automation control panel, a security control panel, a media box (e.g., Samsung HomeSync™, AppleTV™, or Google TV™), a game console (e.g., Xbox™ or PlayStation™), an electronic dictionary, an electronic key, a camcorder, a digital frame, or the like.

According to various embodiments of the disclosure, the electronic device 10 may include, for example, and without limitation, at least one of various medical appliances (e.g., various portable medical measuring instruments (a glucose meter, a heart rate monitor, a blood pressure monitor, or a thermometer), magnetic resonance angiography (MRA), magnetic resonance imaging (MRI), computed tomography (CT), a camera, or an ultrasonic machine), a navigation system, a global navigation satellite system (GNSS), an event data recorder (EDR), a flight data recorder (FDR), a vehicle infortainment apparatus, vessel electronic equipment (e.g., a vessel navigation system, a gyrocompass, etc.), avionics, a security system, a vehicle head unit, an industrial or home robot, a drone, an automated teller machine (ATM) of a financial institution, a point of sales (POS) of a store, an internet of things (IoT) device (e.g., a bulb, various sensors, a sprinkler, a fire alarm, a thermostat, a streetlamp, a toaster, exercise equipment, a hot-water tank, a heater, a boiler, etc.), or the like.

According to various embodiments of the disclosure, the electronic device 10 may include, for example, and without limitation, at least one of furniture, a building/structure, a portion of a vehicle, an electronic board, an electronic signature receiving device, a projector, various metering instruments (e.g., a water meter, an electric watt meter, a gas meter, or a radio wave meter), or the like.

According to various embodiments of the disclosure, the electronic device 10 may include no display. For example, the electronic device 10 may process an image signal received from outside, and transmit the processed image signal to an external display using a separate interface (e.g., a high definition multimedia interface (HDMI), a display port (DP), etc.).

Referring to a reference numeral 1-a of FIG. 1, in operation ①, the electronic device 10 may display a first image 111 and a second image 112 on a display 11. For example, when a user input of executing a style transfer (or, image conversion, image change or image correction) function is received, the electronic device 10 may display a plurality of selectable images on the display 11.

The style transfer function may refer, for example, to, when the electronic device 10 converts (or corrects) an image selected by a user to acquire (or generate) a new image, a style of another image selected by the user.

Referring to the style of the other image may refer, for example, to converting an image considering, for example, a color value, a brightness value, and a saturation value included in the other image. Also, referring to the style of the other image may refer, for example, to applying a color value, a saturation value, and a brightness value of the other image to an image to convert the image while maintaining a main edge component included in the image. Also, referring to the style of the other image may refer, for example, to extracting a main object included in the other image and including the main object in an image to convert the image. However, referring to the style of the other image is not limited to the above-described embodiments.

The user may select two images (e.g., the first image 111 and the second image 112) from among the selectable images. In this case, the first image 111 may, for example, be an image which the user wants to convert to acquire a new image. The second image 112 may be an image with a style to which the user wants to refer to convert the first image 111.

In operation ②, the electronic device 10 may acquire a feature of the first image 111 and a feature of the second image 112. A feature of an image may include, for example, and without limitation, a data size of the image, a resolution of the image, a type (e.g., a still image or a moving image) of the image, a number of selected images, or the like. However, a feature of an image is not limited to the above-mentioned examples.

In operation ③, the electronic device 10 may identify a learning model to be applied to the first image 111 and the second image 112 from among a first learning model included in the electronic device 10 and a second learning model included in the server 20, based on at least one of the feature of the first image 111 or the feature of the second image 112. The first learning model and the second learning model may be set (e.g., configured) to convert the first image 111 into a style of the second image 112 to acquire a third image 113.

According to an embodiment of the disclosure, the learning model may, for example, include a model learned (e.g., trained) according to a supervised learning method or a unsupervised learning method based on an artificial intelligence algorithm. The learning model may include a plurality of network nodes having weights, and the plurality of network nodes may be positioned at different depths (or layers) and transmit/receive data to/from each other according to a convolution connection relationship. For example, and without limitation, a deep neural network (DNN), a recurrent neural network (RNN), a bidirectional recurrent deep neural network (BRDNN), etc. may be used as the learning model, although not limited to these.

According to an embodiment of the disclosure, the first learning model and the second learning model may be the same learning model. In this case, the first learning model may take a longer time to acquire the third image 113 than the second learning model according to a difference between a processing speed of components (e.g., a graphic processing unit (GPU), a central processing unit (CPU), etc.) included in the electronic device 10 and a processing speed of components included in the server 20.

However, the first learning model and the second learning model are not limited to these, and for example, the first learning model and the second learning model may be learning models optimized for the electronic device 10 and the server 20, respectively. In this case, a time taken for the first learning model to acquire the third image 113 may be equal to or shorter than a time taken for the second learning model to acquire the third image 113.

According to an embodiment of the disclosure, the electronic device 10 may identify a learning model to be applied to the first image 111 and the second image 112, based, for example, and without limitation, on at least one of a resolution size of the first image 111 or a resolution size of the second image 112, or the like. In addition, the electronic device 10 may further refer to a network state with a network connection to the server 20. For example, when the resolution size of the first image 111 is smaller than a predetermined value, the electronic device 10 may identify the first learning model as a learning model to be applied to the first image 111 and the second image 112. When the resolution size of the first image 111 is greater than or equal to the predetermined value, the electronic device 10 may, for example, identify the second learning model as a learning model to be applied to the first image 111 and the second image 112.

According to various embodiments of the disclosure, the electronic device 10 may identify a learning model to be applied to the first image 111 and the second image 112, based, for example, and without limitation, on at least one of a data size of the first image 111 or a data size of the second image 112, or the like. For example, when the data size of the first image 111 is smaller than a predetermined value, the electronic device 10 may identify the first learning model as a learning model to be applied to the first image 111 and the second image 112. When the data size of the first image 111 is greater than or equal to the predetermined value, the electronic device 10 may identify the second learning model as a learning model to be applied to the first image 111 and the second image 112.

For example, and without limitation, a resolution of the first image 111 may be 1280×720. The electronic device 10 may determine that a first required time expected for the first learning model to acquire the third image 113 is about 7 seconds to 8 seconds, a second required time expected for the second learning model to acquire the third image 113 is about 2 seconds to 3 seconds, and a time for data transmission/reception between the electronic device 10 and the server 20 is about 6 seconds to 7 seconds, based on the resolution of the first image 111.

The electronic device 10 may, for example, and without limitation, identify the first learning model as a learning model to be applied to the first image 111 and the second image 112, based on the determination that about 7 seconds to 8 seconds are taken to acquire the third image 113 using the first learning model and about 8 seconds to 10 seconds are taken to acquire the third image 113 using the second learning model.

In operation ④, the electronic device 10 may execute the style transfer function to convert the first image 111 into the third image 113 with reference to the style of the second image 112 using the first learning model included in the electronic device 10.

Referring to a reference numeral 1-b of FIG. 1, the electronic device 10 may display the third image 113 on the display 11. In this case, the electronic device 10 may display the third image 113 together with the first image 111 and the second image 112 on the display 11.

For example, a resolution of the first image 111 may be 1920×1080. The electronic device 10 may, for example, and without limitation, determine that a first required time expected for the first learning model to acquire the third image 113 is about 15 seconds to 17 seconds, a second required time expected for the second learning model to acquire the third image 113 is about 4 seconds to 5 seconds, and a time for data transmission/reception between the electronic device 10 and the server 20 is about 9 seconds to 10 seconds, based on the resolution of the first image 111.

The electronic device 10 may identify the second learning model as a learning model to be applied to the first image 111 and the second image 112, based, for example, on the determination that about 15 seconds to 17 seconds are taken to acquire the third image 113 using the first learning model and about 13 seconds to 15 seconds are taken to acquire the third image 113 using the second learning model.

In operation ④, the electronic device 10 may transfer the first image 111 and the second image 112 to the server 20.

In operation ⑤, the server 20 may execute the style transfer function to convert the first image 111 into the third image 113 with reference to the style of the second image 112 using the second learning model.

In operation ⑥, the server 20 may transfer the third image 113 to the electronic device 10.

Referring to the reference numeral 1-*b* of FIG. 1, the electronic device 10 may display the third image 113 on the display 11. In this case, the electronic device 10 may display the third image 113 together with the first image 111 and the second image 112 on the display 11.

According to an embodiment of the disclosure, the electronic device 10 may efficiently identify a learning model used for image conversion, based on a feature of an image to be converted or a feature of an image to be referred to for conversion. Also, the electronic device 10 may efficiently identify a learning model based on a speed of a data communication with the learning model.

Figure 2:
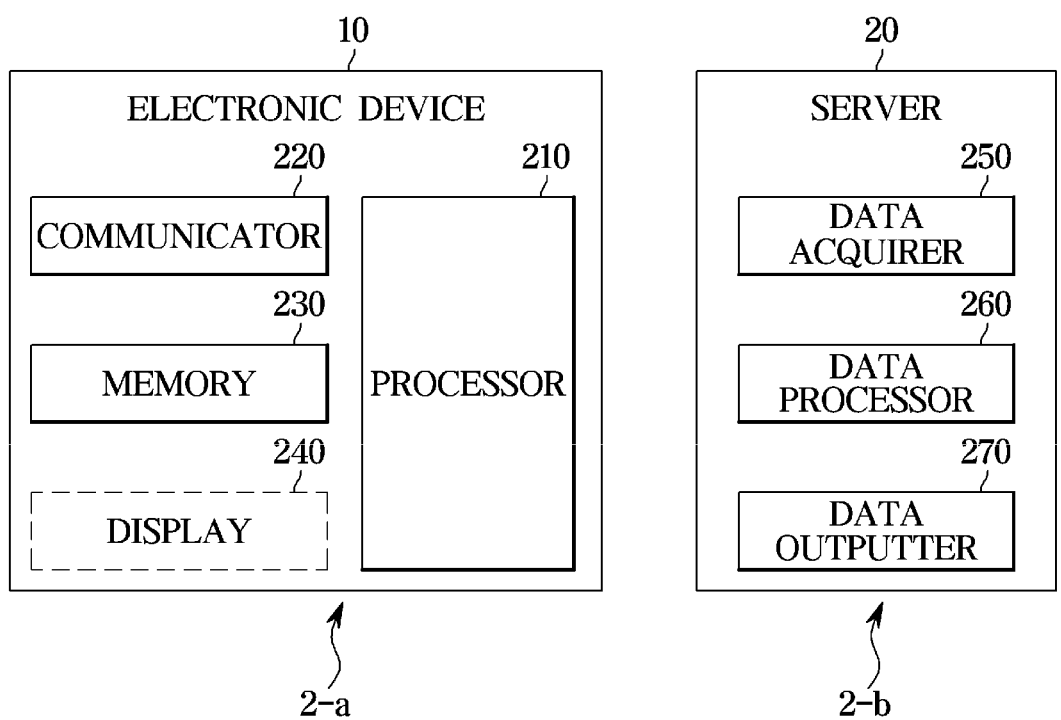
FIG. 2 is a block diagram illustrating an example server and an example electronic device according to an embodiment of the disclosure.

FIG. 2 is a block diagram illustrating an example server and an example electronic device according to an embodiment of the disclosure.

Referring to a reference numeral 2-*a* of FIG. 2, the electronic device 10 may include a processor (e.g., including processing circuitry) 210, a communicator (e.g., including communication circuitry) 220, and a memory 230. However, the electronic device 10 is not limited to the above-mentioned components. The electronic device 10 may further include other components, or some of the above-mentioned components may be omitted. For example, the electronic device 10 may include a display 240.

According to an embodiment, the memory 230 may store various operating systems (OSs) for driving the electronic device 10, and also store various software programs (or applications) for operating the electronic device 10 and data and instructions for operations of the electronic device 10. At least a part of the programs may be downloaded from an external server through a wired or wireless communication. The memory 230 may be implemented, for example, and without limitation, as a non-volatile memory, a volatile memory, a flash memory, a hard disk drive (HDD), a solid state drive (SSD), etc. The memory 230 may be accessed by the processor 210, and in the memory 230, read/write/correction/deletion/update of data may be performed by the processor 210.

According to an embodiment of the disclosure, the memory 230 may acquire a feature of the first image and a feature of the second image, and store a plurality of instructions set to identify a learning model to be applied to the first image and the second image from among a plurality of learning models including the first learning model included in the electronic device 10 and the second learning model included in a server which has established a communication with the electronic device 10 through the communicator 220, based on at least one of the feature of the first image or the feature of the second image.

According to an embodiment of the disclosure, the communicator 220 may include various communication circuitry and connect the electronic device 10 to an external device (e.g., a server or another electronic device) under control of the processor 210. The communicator 220 may include various components that implement various wired or wireless communication methods, such as, for example, and without limitation, a wireless local area network (WLAN), Bluetooth, a wired Ethernet, or the like, to correspond to performance and a structure of the electronic device 10.

According to an embodiment of the disclosure, the display 240 may display various content by a control of the processor 210. The display 240 of FIG. 2 may include the display 11 of FIG. 1. The display 240 may display an image, video, characters, and/or an execution screen of an application. When the display 240 is implemented as a touch screen display, the display 240 may be used as an inputter (e.g., including various input circuitry), as well as an outputter (e.g., including various output circuitry).

According to an embodiment of the disclosure, the processor 210 may include various processing circuitry and control the above-mentioned components of the electronic device 10. For example, the processor 210 may acquire a feature of an image or convert (or correct) an image using a plurality of software stored in the memory 230.

According to an embodiment of the disclosure, the processor 210 may copy and execute various programs stored in the memory 230 on RAM to perform various operations. In the disclosure, the processor 210 may include, for example, a single CPU, however, the processor 210 may be configured with a plurality of CPUs (or digital signal processors (DSPs) or SoCs) or may include multiple processors. For example, the processor 210 may include a dedicated neural processing unit (NPU) optimized to acquire a new image using a plurality of images.

According to various embodiments of the disclosure, the processor 210 may be implemented, for example, and without limitation, as a DSP, a microprocessor, a time controller (TCON), etc. to process digital signals. However, the processor 210 is not limited to the above-mentioned examples. The processor 210 may include, for example, and without limitation, at least one of a CPU, a dedicated processor, a micro controller unit (MCU), a micro processing unit (MPU), a controller, an application processor (AP), a communication processor (CP), an ARM processor, or the like, or may be defined by a corresponding term. The processor 210 may be implemented as system on chip (SOC) or large scale integration (LSI) in which a processing algorithm is installed, or in the form of a field programmable gate array (FPGA).

According to an embodiment of the disclosure, the processor 210 may acquire (or control the electronic device to acquire) a feature of the first image and a feature of the second image, and identify a learning model to be applied to the first image and the second image from among a plurality of learning models including the first learning model included in the electronic device 10 and the second learning model included in a server which has established a communication with the electronic device 10 through the communicator 220, based on at least one of the feature of the first image or the feature of the second image.

Referring to a reference numeral 2-*b* of FIG. 2, the server 20 may include a data acquirer (e.g., including various data receiving circuitry) 250, a data processor (e.g., including processing circuitry) 260, and a data outputter (e.g., including output circuitry) 270.

According to an embodiment of the disclosure, the data acquirer 250 may include various data receiving circuitry and acquire a plurality of images (e.g., the first image 111 and the second image 112 of FIG. 1) from an external device.

According to an embodiment of the disclosure, the data processor 260 may include various processing circuitry and acquire a new image using the plurality of images. For example, the data processor 260 may apply the first image 111 and the second image 120 to a learning model configured to convert the first image 111 into a style of the second image 112 to acquire the third image 113, thereby acquiring a new image.

According to an embodiment of the disclosure, the data outputter 270 may include various data output circuitry and transfer the new image to the external device.

Figure 3:
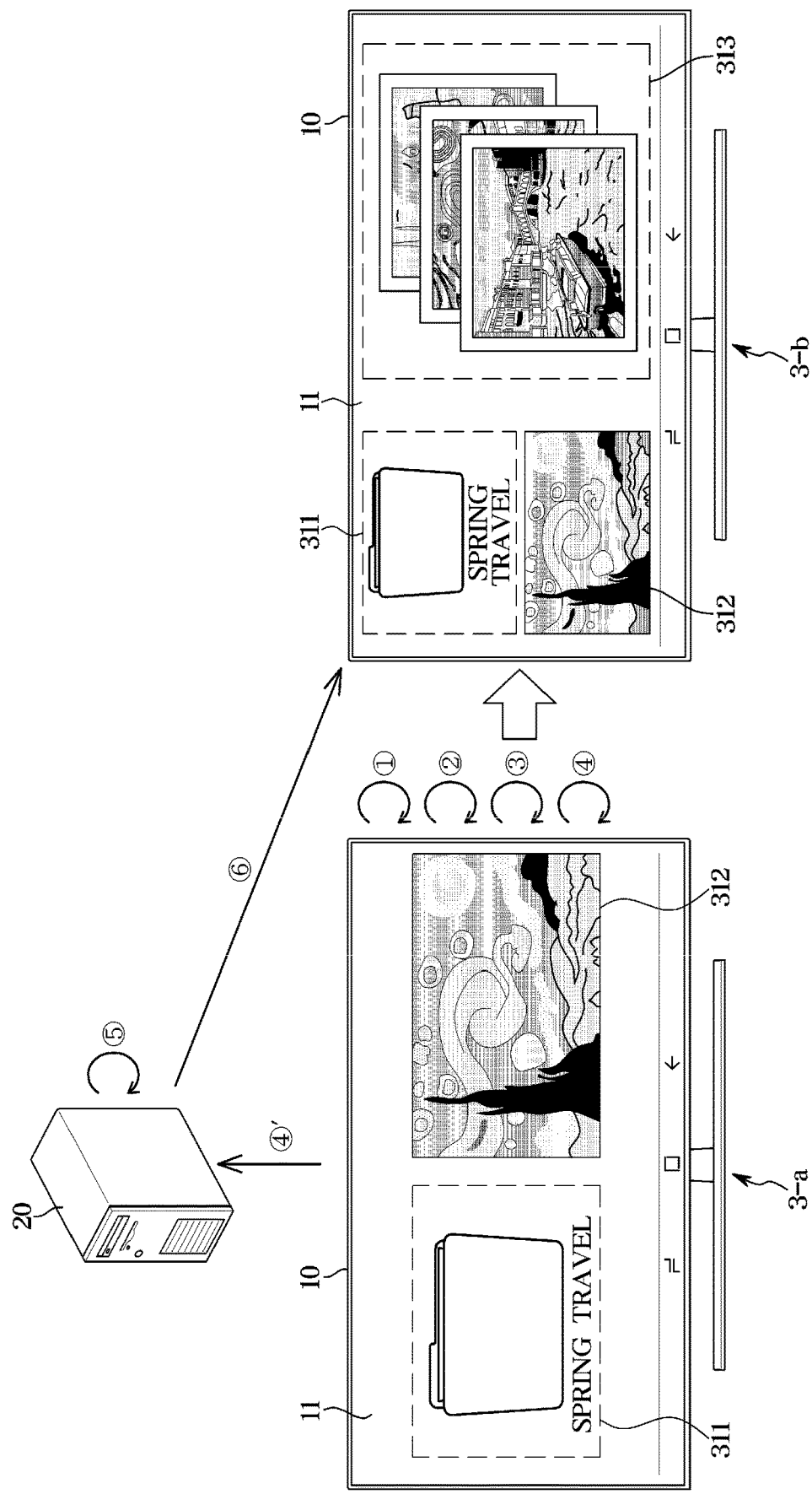
FIG. 3 is a diagram illustrating an example in which an electronic device acquires a new image using a plurality of images included in a folder according to an embodiment of the disclosure.

FIG. 3 is a diagram illustrating an example in which an electronic device acquires a new image using a plurality of images included in a folder according to an embodiment of the disclosure.

Referring to a reference numeral 3-*a* of FIG. 3, in operation ①, the electronic device 10 may display a folder 311 including a plurality of images and a second image 312 on the display 11. For example, when a user input for executing the style transfer function is received, the electronic device 10 may display a plurality of selectable images and/or a plurality of folders each including at least one image on the display 11.

The user may select a folder (e.g., a folder 311 including a plurality of first images) and an image (e.g., the second image 312) from among the plurality of selectable images and the plurality of folders. In this case, the plurality of first images included in the folder 311 may be images which the user wants to convert to acquire a new image. The second image 312 may be an image with a style to which the user wants to refer to convert the first images.

In operation ②, the electronic device 10 may acquire features of the plurality of first images included in the folder 311 and a feature of the second image 312. A feature of an image may include, for example, and without limitation, a data size of the image, a resolution of the image, a type (e.g., a still image or a moving image) of the image, a number of selected images, or the like. However, a feature of an image is not limited to the above-mentioned examples.

In operation ③, the electronic device 10 may identify a learning model to be applied to the plurality of first images included in the folder 311 and the second image 312 from among the first learning model included in the electronic device 10 and the second learning model included in the server 20, based on the features of the plurality of first images included in the folder 311 and the feature of the second image 312. The first learning model and the second learning model may, for example, be learning models configured to convert the first images into the style of the second image 312 to acquire a third image.

According to an embodiment of the disclosure, the electronic device 10 may identify a learning model to be applied to the plurality of first images included in the folder 311 and the second image 312, based, for example, and without limitation, on at least one of resolution sizes of the plurality of first images included in the folder 311 or a resolution size of the second image 312, or the like.

For example, to efficiently manage a time taken to acquire the third image, the electronic device 10 may convert images having resolution sizes that are smaller than a reference resolution size among the plurality of first images in the first learning model, and convert the remaining images having resolution sizes that are greater than the reference resolution size among the plurality of first images in the second learning model.

For example, the electronic device 10 may apply the first learning model to images having a resolution of 1280×720 among the plurality of first images to acquire a plurality of third images, and apply the second learning model to images having a resolution of 1920×1080 to acquire a plurality of third images.

For example, the electronic device 10 may select the first learning model or the second learning model based on types or kinds of the plurality of first images. When, for example, a kind of some of the plurality of first images is still images, the electronic device 10 may select the first learning model, and, when, for example, a kind of some of the plurality of first images is moving images, the electronic device 10 may select the second learning model.

However, the electronic device 10 may identify images that are to be applied to the first learning model and images that are to be applied to the second learning model through various combinations based, for example, and without limitation, on times taken for image conversion according to resolutions of the plurality of first images included in the folder 311 selected by the user.

In operation ④, the electronic device 10 may, for example, execute the style transfer function to convert images having a resolution of 1280×720 among the plurality of first images to a plurality of third images 313 with reference to the style of the second image 312, using the first learning model included in the electronic device 10.

In operation ④′, the electronic device 10 may transfer the second image 312 and images having a resolution of 1920× 1080 among the plurality of first images to the server 20.

In operation ⑤, the server 20 may execute the style transfer function to convert the images having the resolution of 1920×1080 among the plurality of first images to a plurality of third images 313 with reference to the style of the second image 312, using the second learning model.

In operation ⑥, the server 20 may transmit the plurality of third images 313 to the electronic device 10.

Referring to a reference numeral 3-*b* of FIG. 3, the electronic device 10 may display the third images 313 acquired using the first learning model and the third images 313 acquired using the second learning model and received from the server 20 on the display 11. In this case, the electronic device 10 may display the third images 313 together with the second image 312 and the folder 311 selected by the user on the display 11.

As such, according to an embodiment of the disclosure, the electronic device 10 may perform, when converting a plurality of images, both image conversion using the first learning model and image conversion using the second learning model to efficiently distribute a time required for image conversion.

Figure 4:
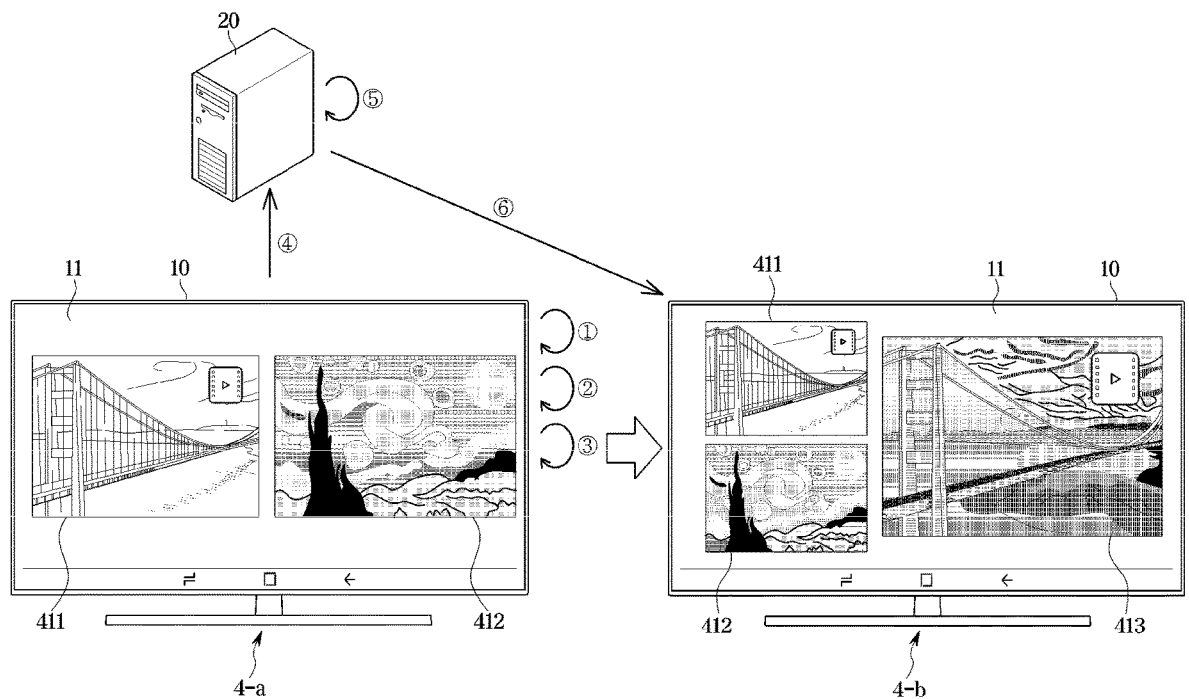
FIG. 4 is a diagram illustrating an example in which an electronic device acquires a new moving image using a moving image according to an embodiment of the disclosure.

FIG. 4 is a diagram illustrating an example in which an electronic device acquires a new moving image using a moving image according to an embodiment of the disclosure.

Referring to a reference numeral 4-*a* of FIG. 4, in operation ①, the electronic device 10 may display a first image 411 and a second image 412 on the display 11. The first image 411 may be a moving image. For example, when a user input of executing the style transfer function is received, the electronic device 10 may display a plurality of selectable images on the display 11.

The user may select an image (e.g., the first image 411) and another image (e.g., the second image 412) from among the plurality of selectable images. In this case, the first image 411 may be an image which the user wants to convert to acquire a new image. The second image 412 may be an image with a style to which the user wants to refer to convert the first image 411.

In operation ②, the electronic device 10 may acquire a feature of the first image 411 and a feature of the second image 412. A feature of an image may include, for example, and without limitation, a data size of the image, a resolution of the image, a type (e.g., a still image or a moving image) of the image, a number of selected images, or the like. However, a feature of an image is not limited to the above-mentioned examples.

In operation ③, the electronic device 10 may identify a learning model to be applied to the first image 411 and the second image 412 from among the first learning model included in the electronic device 10 and the second learning model included in the server 20, based on at least one of the feature of the first image 411 or the feature of the second image 412. The first learning model and the second learning model may be learning models configured to convert the first image 411 into the style of the second image 412 to acquire a third image 413.

According to an embodiment of the disclosure, the electronic device 10 may identify a learning model to be applied to the first image 411 and the second image 412 based on a type of the first image 411. For example, when the first image 411 is a moving image, the electronic device 10 may identify the second learning model as a learning model to be applied to the first image 411 and the second image 412.

In operation ④, the electronic device 10 may transfer the first image 411 and the second image 412 to the server 20.

In operation ⑤, the server 20 may execute the style transfer function to convert the first image 411 into the third image 413 with reference to the style of the second image 412, using the second learning model.

In operation ⑥, the server 20 may transfer the third image 413 to the electronic device 10.

Referring to a reference numeral 4-*b* of FIG. 4, the electronic device 10 may display the third image 413 acquired using the second learning model and received from the server 20 on the display 11. In this case, the electronic device 10 may display the third image 413 together with the second image 412 and the first image 411 selected by the user on the display 11.

As such, according to an embodiment of the disclosure, the electronic device 10 may use a learning model having a high processing speed to efficiently manage a time taken for image conversion, based on a type of an image to be converted.

Figure 5:
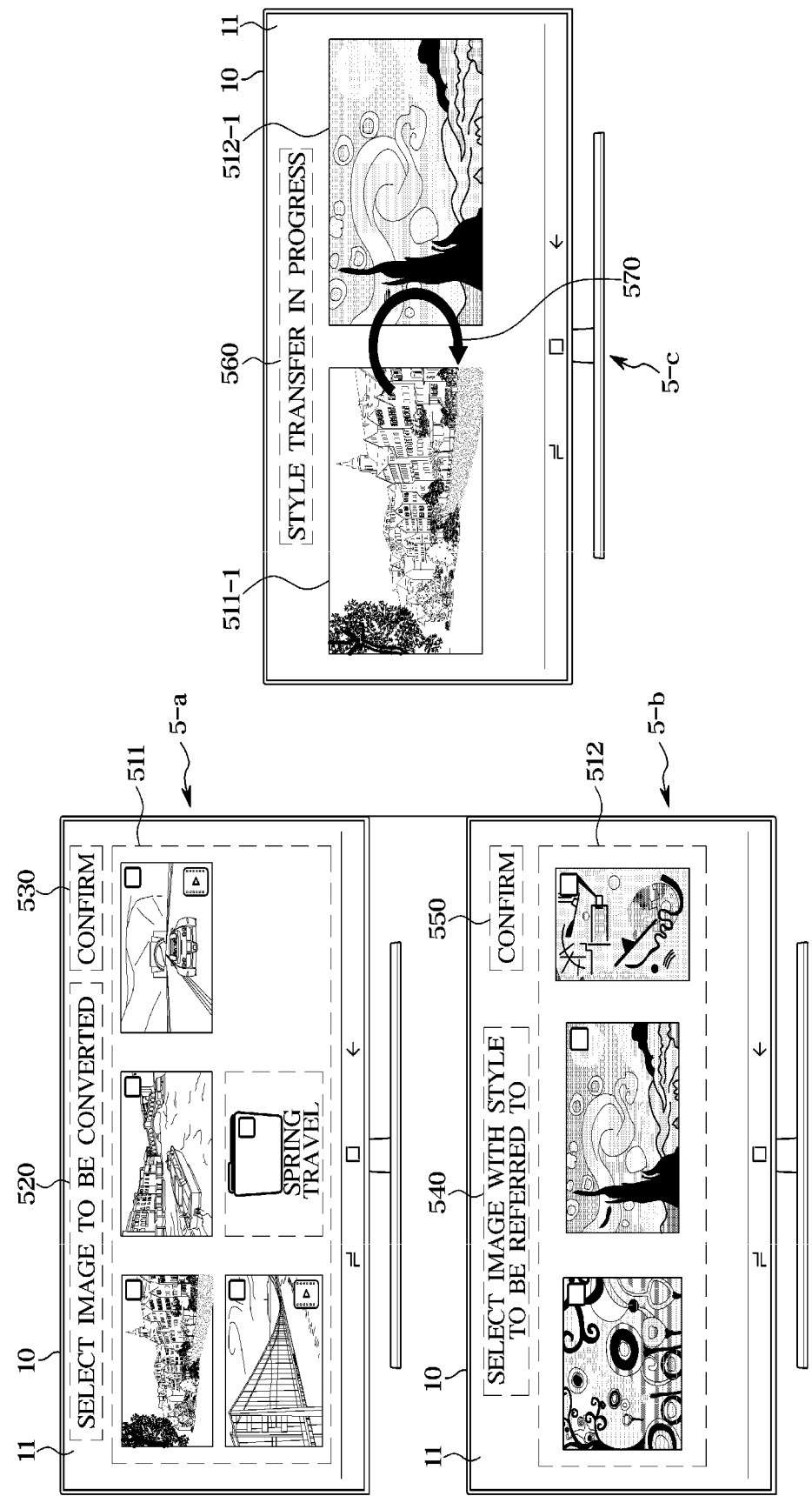
FIG. 5 is a diagram illustrating an example in which a user selects a first image and a second image from among a plurality of images using an electronic device according to an embodiment of the disclosure.

FIG. 5 is a diagram illustrating an example in which a user selects a first image and a second image from among a plurality of images using an electronic device according to an embodiment of the disclosure.

Referring to a reference numeral 5-*a* of FIG. 5, the electronic device 10 may display a plurality of images 511 that are selectable based on a user input of executing the style transfer function, on the display 11. In this case, the plurality of images 511 displayed on the display 11 by the electronic device 10 may be candidate images of a first image to be converted into a third image. The electronic device 10 may display a guide 520 notifying of a step of selecting a first image on the display 11.

According to an embodiment of the disclosure, the electronic device 10 may select at least one image (referred to as a first image) to be converted into a third image from among the plurality of images 511 displayed on the display 11 and then confirm the first image based on a user input of inputting confirm 530.

Referring to a reference numeral 5-*b* of FIG. 5, the electronic device 10 may display a plurality of images 512 on the display 11. In this case, the plurality of images 512 displayed on the display 11 by the electronic device 10 may be candidate images of a second image to which the user wants to refer to convert the first image into the third image. The electronic device 10 may display a guide 540 notifying of a step of selecting the second image on the display 11, together with the images 512.

According to an embodiment of the disclosure, the electronic device 10 may select at least one image (that is, the second image) from among the plurality of images 512 displayed on the display 11 and then confirm the second image based on a user input of inputting confirm 550.

Referring to a reference numeral 5-*c* of FIG. 5, after a first image 511-1 and a second image 512-1 are confirmed, the electronic device 10 may execute the style transfer function to convert the first image 511-1 into a style of the second image 512-1 to acquire the third image. For example, the electronic device 10 may execute the style transfer function by performing operations described above with reference to FIGS. 1, 3, and 4 to acquire the third image, and display the acquired third image on the display 11. In this case, the electronic device 10 may display a guide 560 and/or an icon 570 notifying that the style transfer function is performed, on the display 11.

Figure 6:
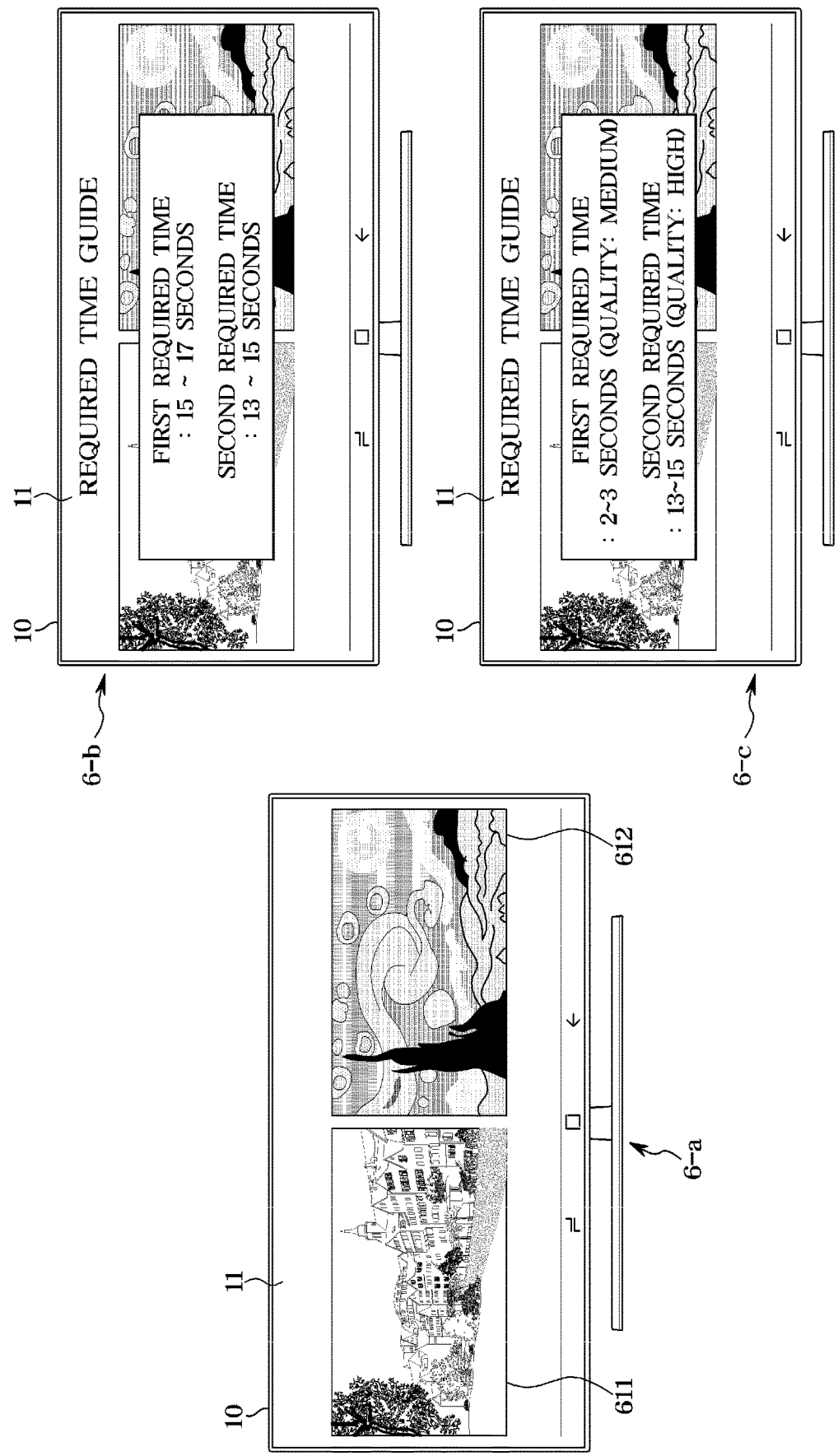
FIG. 6 is a diagram illustrating an example in which an electronic device guides required times based on image conversion according to an embodiment of the disclosure.

FIG. 6 is a diagram illustrating an example in which an electronic device guides required times based on image conversion according to an embodiment of the disclosure.

Referring to a reference numeral 6-*a* of FIG. 6, the electronic device 10 may display a first image 611 and a second image 612 on the display 11. For example, when a user input of executing the style transfer function is received, the electronic device 10 may display a plurality of selectable images on the display 11.

According to an embodiment of the disclosure, the user may select two images (e.g., the first image 611 and the second image 612) from among the plurality of selectable images. In this case, the first image 611 may be an image which the user wants to convert to acquire a new image. The second image 612 may be an image with a style to which the user wants to refer to convert the first image 611.

According to an embodiment of the disclosure, the electronic device 10 may acquire a feature of the first image 611 and a feature of the second image 612. The electronic device 10 may identify a learning model to be applied to the first image 611 and the second image 612 from among a plurality of learning models including a first learning model included in the electronic device 10 and a second learning model included in the server 20, based on at least one of the feature of the first image 611 or the feature of the second image 612.

Referring to a reference numeral 6-*b* of FIG. 6, the electronic device 10 may acquire a required time expected to convert the first image 611 to acquire a third image, and output the required time, before converting the first image 611.

According to an embodiment of the disclosure, the electronic device 10 may acquire a first required time expected for the first learning model to convert the first image 611 into the third image. Also, the electronic device 10 may acquire a second required time expected for the second learning model to convert the first image 611 into the third image. The electronic device 10 may acquire the first required time and the second required time based on the feature of the first image 611 and the feature of the second image 612.

For example, when a resolution of the first image 611 is 1920×1080, the electronic device 10 may acquire a first required time of 15 seconds to 17 seconds expected to convert the first image 611 into the third image using the first learning model.

Also, when the resolution of the first image 611 is 1920×1080, the electronic device 10 may, for example, acquire a first required time of 4 seconds to 5 seconds expected to convert the first image 611 into the third image using the second learning model.

According to an embodiment of the disclosure, the electronic device 10 may, for example, add a time required for a data communication between the electronic device 10 and the server 20 to the second required time. For example, the electronic device 10 may add a sum (9 seconds to 10 seconds) of a time taken for the electronic device 10 to transmit the first image 611 to the server 20 and a time taken for the server 20 to transmit the third image to the electronic device 10 to the second required time.

Referring to the reference numeral 6-*b* of FIG. 6, the electronic device 10 may, for example, output the acquired required times on the display 11. For example, the electronic device 10 may output the first required time of 15 seconds to 17 seconds and the second required time of 13 seconds to 15 seconds on the display 11.

According to an embodiment of the disclosure, the electronic device 10 may determine a learning model to be applied to the first image 611 and the second image 612 based on a user input of selecting one of the first required time or the second required time output on the display 11.

For example, when the user selects the first required time, the electronic device 10 may determine the first learning model as a learning model to be applied to the first image 611 and the second image 612. Also, for example, when the user selects the second required time, the electronic device 10 may select the second learning model as a learning model to be applied to the first image and the second image.

Referring to a reference numeral 6-*c* of FIG. 6, the electronic device 10 may display the first required time and the second required time together with information about quality of the third image that will be acquired.

According to an embodiment of the disclosure, the first learning model and the second learning model may be learning models optimized for the electronic device 10 and the server 20, respectively. In this case, a time taken for the first learning model to acquire the third image may be equal to or shorter than a time taken for the second learning model to acquire the third image.

In this case, a number of layers included in the first learning model may be smaller than a number of layers included in the second learning model. Therefore, quality of the third image acquired using the first learning model may be different from that of the third image acquired using the second learning model. The quality of the third image may be, for example, definition (e.g., quality/resolution) of the third image or a degree by which a style of the second image is reflected to convert the first image. For example, a third image of higher quality may be acquired at a large number of layers included in a learning model, and a third image of lower quality may be acquired at a smaller number of layers included in a learning model.

For example, when a resolution of the first image 611 is 1920×1080, the electronic device 10 may acquire the first required time of 2 seconds to 3 seconds expected for the first learning model to convert the first image 611 into the third image. In this case, the electronic device 10 may display expected quality of the third image acquired using the first learning model as "medium".

Also, when the resolution of the first image 611 is 1920×1080, the electronic device 10 may, for example, acquire the first required time of 4 seconds to 5 seconds expected for the second learning model to convert the first image 611 into the third image. In this case, the electronic device 10 may display expected quality of the third image acquired using the second learning model as "high".

According to an embodiment of the disclosure, the electronic device 10 may add a time required for a data communication with the server 20 to the second required time. For example, the electronic device 10 may add a sum (9 seconds to 10 seconds) of a time taken for the electronic device 10 to transmit the first image 611 to the server 20 and a time taken for the server 20 to transmit the third image to the electronic device 10 to the second required time.

Referring to the reference numeral 6-*c* of FIG. 6, the electronic device 10 may output the acquired required times and the information about the quality of the third image on the display 11. For example, the electronic device 10 may output the first required time as 2 seconds to 3 seconds, and the quality of the third image as "medium". Also, the electronic device 10 may output the second required time as 13 seconds to 15 seconds, and the quality of the third image as "high".

According to an embodiment of the disclosure, the electronic device 10 may determine a learning model to be applied to the first image 611 and the second image 612 based on a user input of selecting one of the first required time and the second required time output on the display 11.

For example, when the user selects the first required time, the electronic device 10 may determine the first learning model as a learning model to be applied to the first image 611 and the second image 612. Also, for example, when the user selects the second required time, the electronic device 10 may determine the second learning model as a learning model to be applied to the first image 611 and the second image 612.

As such, the electronic device 10 may provide the user with information about expected required times and information about expected qualities of the third image when converting the first image 611 using the first learning model and the second learning model to aid in the user's selection.

Figure 7:
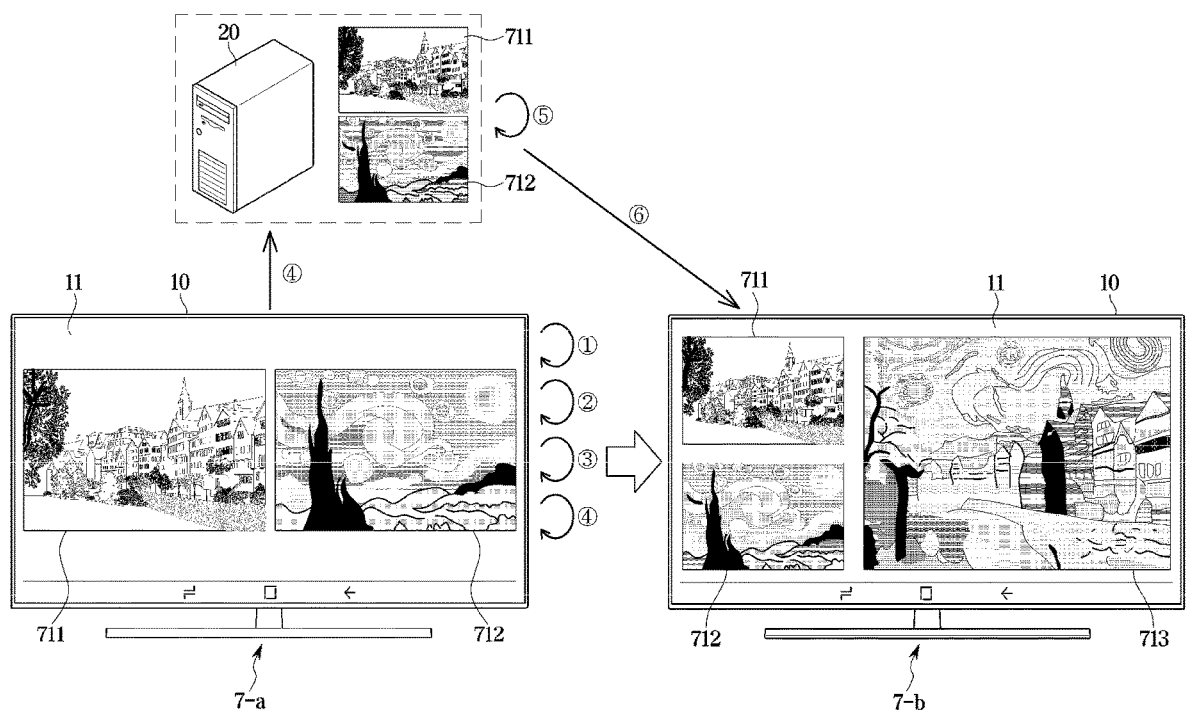
FIG. 7 is a diagram illustrating an example in which an electronic device generates an image when a server has already stored a first image or a second image according to an embodiment of the disclosure.

FIG. 7 is a diagram illustrating an example in which an electronic device generates an image when a server has already stored a first image or a second image according to an embodiment of the disclosure.

Referring to a reference numeral 7-*a* of FIG. 7, in operation ①, the electronic device 10 may display a first image 711 and a second image 712 on the display 11. For example, when a user input of executing the style transfer function is received, the electronic device 10 may display a plurality of selectable images on the display 11.

The user may select an image (for example, the first image 711 being a moving image) and another image (for example, the second image 712) from among the plurality of selectable images. In this case, the first image 711 may be an image which the user wants to convert to acquire a new image. The second image 712 may be an image with a style to which the user wants to refer to convert the first image 711.

In operation ②, the electronic device 10 may acquire a feature of the first image 711 and a feature of the second image 712. A feature of an image may include, for example, and without limitation, a data size of the image, a resolution of the image, a type (e.g., a still image or a moving image) of the image, a number of selected images, or the like. However, a feature of an image is not limited to the above-mentioned examples.

In operation ③, the electronic device 10 may identify a learning model to be applied to the first image 711 and the second image 712 from among a first learning model included in the electronic device 10 and a second learning model included in the server 20, based, for example, and without limitation, on at least one of the feature of the first image 711 or the feature of the second image 712. The first learning model and the second learning model may be learning models configured to convert the first image 711 into a style of the second image 712 to acquire a third image.

For example, a resolution of the first image 711 may be 1280×720. The electronic device 10 may determine that a first required time expected for the first learning model to acquire the third image is about 7 seconds to 8 seconds, a second required time expected for the second learning model to acquire the third image is about 2 seconds to 3 seconds, and a time for data transmission/reception between the electronic device 10 and the server 20 is about 6 seconds to 7 seconds, based on the resolution of the first image 711.

The electronic device 10 may identify the first learning model as a learning model to be applied to the first image 711 and the second image 712, based on the determination that about 7 seconds to 8 seconds are taken to acquire the third image using the first learning model and about 8 seconds to 10 seconds are taken to acquire the third image using the second learning model.

According to an embodiment of the disclosure, the electronic device 10 may determine whether there is a history about sharing of the first image 711 and/or the second image 712 with the server 20. For example, the electronic device 10 may determine whether the server 20 has already stored at least one of the first image 711 or the second image 712 based on a history about data transmission/reception to/from the server 20.

In operation ④, when the electronic device 10 determines that there is a history about sharing of at least one of the first image 711 or the second image 712 with the server 20, the electronic device 10 may identify the second learning model as a learning model to be applied to the first image 711 and the second image 712. In this case, the electronic device 10 may transmit an image not stored in the server 20 among the first image 711 and the second image 711 to the server 20, and transmit a command requesting the server 20 to acquire a third image using the first image 711 and the second image 712 to the server 20.

In operation ⑤, the server 20 may execute the style transfer function to convert the first image 711 into a third image 713 with reference to a style of the second image 712 using the second learning model.

In operation ⑥, the server 20 may transmit a plurality of third images to the electronic device 10.

Referring to a reference numeral 7-b of FIG. 7, the electronic device 10 may display the third image 713 acquired using the second learning model and received from the server 20 on the display 11. In this case, the electronic device 10 may display the third image 713 together with the first image 711 and the second image 712 selected by the user on the display 11.

Figure 8:
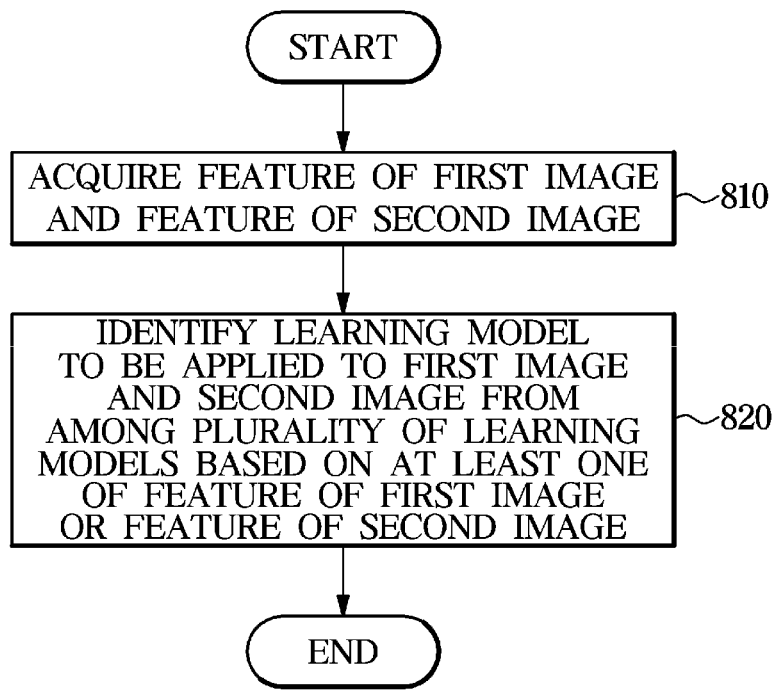
FIG. 8 is a flowchart illustrating an example in which an electronic device acquires a new image using a plurality of images according to an embodiment of the disclosure.

FIG. 8 is a flowchart illustrating an example in which an electronic device acquires a new image using a plurality of images according to an embodiment of the disclosure.

In operation 810, the electronic device 10 may acquire a feature of a first image and a feature of a second image.

For example, when a user input of executing the style transfer function is received, the electronic device 10 may display a plurality of selectable images on a display.

The user may select two images (for example, a first image (e.g.: the first image 111 of FIG. 1) and a second image (e.g.: the second image 112 of FIG. 1)) from among the plurality of selectable images. In this case, the first image may be an image which the user wants to convert to acquire a new image. The second image may be an image with a style to which the user wants to refer to convert the first image.

The electronic device 10 may acquire the feature of the first image and the feature of the second image. A feature of an image may include, for example, a data size of the image, a resolution of the image, a type (e.g., a still image or a moving image) of the image, or a number of selected images. However, a feature of an image is not limited to the above-mentioned examples.

In operation 820, the electronic device 10 may identify a learning model to be applied to the first image and the second image from among a plurality of learning models including a first learning model included in the electronic device 10 and a second learning model stored in a server which has established a communication with the electronic device 10 through a communicator, based on at least one of the feature of the first image or the feature of the second image.

For example, the electronic device 10 may identify a learning model to be applied to the first image and the second image using, for example, and without limitation, at least one of a data size of the first image and/or the second image, a resolution of the first image and/or the second image, a type of the first image and/or the second image, a number of selected images, or the like.

According to an embodiment of the disclosure, the first learning model and the second learning model may be learning models configured to convert the first image into a style of the second image to acquire a third image.

Figure 9:
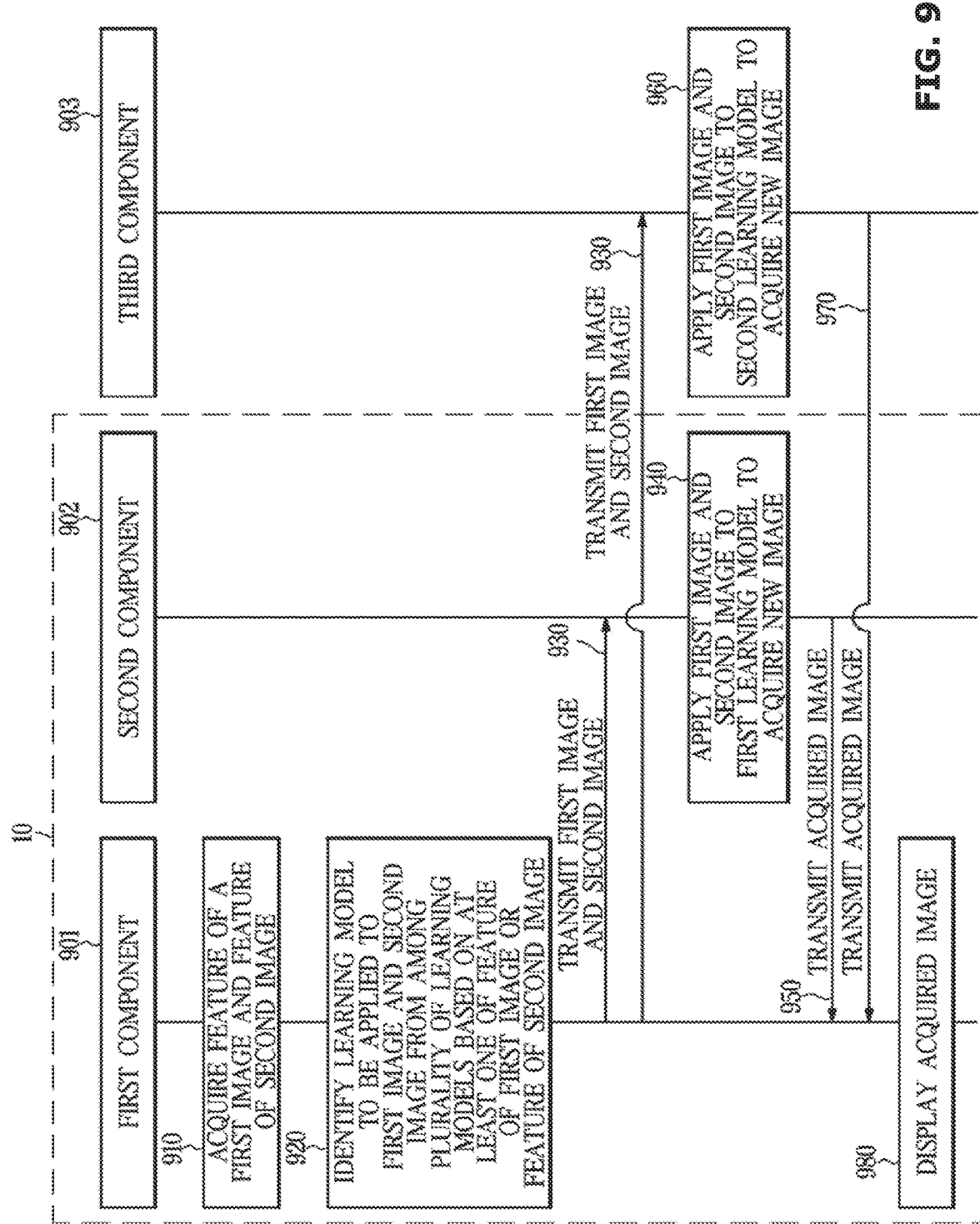
FIG. 9 is a signal flow diagram illustrating an example in which a server and an electronic device acquire a new image using a plurality of images according to an embodiment of the disclosure.

FIG. 9 is a signal flow diagram illustrating an example in which a server and an electronic device acquire a new image using a plurality of images according to an embodiment of the disclosure.

According to an embodiment of the disclosure, a first component 901 and a second component 902 may be components included in the electronic device 10. For example, the first component 901 may include a general-purpose component, and the second component 902 may include a first learning model. A third component 903 may, for example, be the server 20 in which a second learning model is stored. The first component 901 may, for example, be at least one application, and the second component 902 may, for example, be an OS. However, the first to third components 901 to 903 are not limited to the above-described examples. For example, the first component 901 and the second component 902 may be components included in different devices.

The second component 902 and the third component 903 may, for example, be components that are more integrated or dedicated or have a lower delay, higher performance, or more resources than the first component 901 to more quickly and effectively perform many operations required for generation/update/application of a learning model (or a data recognition model) than the first component 901.

In this case, an interface for transmitting/receiving data between the first component 901 and the second component 902 or between the first component 901 and the third component 903 may be included.

For example, an application program interface (API) having learning data to be applied to a learning model as a factor value (or a parameter value or a transfer value) may be included. The API may refer, for example, to a set of sub routines or functions that a protocol (e.g., a protocol defined in the electronic device 10) is capable of calling for certain processing of another protocol (e.g., a protocol defined in the server 20). For example, an environment where a protocol is capable of performing an operation of another protocol may be provided through the API.

In operation 910, the first component 901 may acquire a feature of a first image and a feature of a second image.

In operation 920, the first component 901 may identify a learning model to be applied to the first image and the second image from among the first learning model and the second learning model, based on at least one of the feature of the first image or a feature of the second image.

According to an embodiment of the disclosure, the first component 901 may identify a learning model to be applied to the first image and the second image using, for example, and without limitation, at least one of a data size of the first image and/or the second image, a resolution of the first image and/or the second image, a type of the first image and/or the second image, a number of selected images, or the like. However, a feature of an image is not limited to the above-mentioned examples.

For example, a resolution of the first image may be 1280×720. The first component 901 may determine that a first required time expected for the first learning model included in the second component 902 to acquire a third image is about 7 seconds to 8 seconds, a second required time expected for the second learning model included in the third component 903 to acquire the third image is about 2 seconds to 3 seconds, and a time for data transmission/reception between the first component 901 and the third component 903 is about 6 seconds to 7 seconds, based on the resolution of the first image.

The first component 901 may identify the first learning model as a learning model to be applied to the first image and the second image, based on the determination that about 7 seconds to 8 seconds are taken to acquire the third image using the first learning model and about 8 seconds to 10 seconds are taken to acquire the third image using the second learning model.

For example, a resolution of the first image may be 1920×1080. The first component 901 may determine that a first required time expected for the first learning model included in the second component 902 to acquire the third image is about 15 seconds to 17 seconds, a second required time expected for the second learning model included in the third component 903 to acquire the third image is about 4 seconds to 5 seconds, and a time for data transmission/reception between the first component 901 and the third component 903 is about 9 seconds to 10 seconds, based on the resolution of the first image.

The first component 901 may identify the second learning model as a learning model to be applied to the first image and the second image, based on the determination that about 15 seconds to 17 seconds are taken to acquire the third image using the first learning model and about 13 seconds to 15 seconds are taken to acquire the third image using the second learning model.

In operation 930, when the first component 901 identifies the first learning model as a learning model to be applied to the first image and the second image, the first component 901 may transmit the first image and the second image to the second component 902.

In operation 940, the second component 902 may apply the first image and the second image to the first learning model to acquire the third (e.g., new) image resulting from converting the first image into a style of the second image.

In operation 950, the second component 902 may transmit the third image to the first component 901.

In operation 930, when the first component 901 identifies the second learning model as a learning model to be applied to the first image and the second image, the first component 901 may transmit the first image and the second image to the third component 903.

In operation 960, the third component 903 may apply the first image and the second image to the second learning model to acquire the third image resulting from converting the first image into the style of the second image.

In operation 970, the third component 903 may transmit the third image to the first component 901.

In operation 980, the first component 901 may display the third image. In this case, the first component 901 may display the third image together with the first image and the second image on a display.

Figure 10:
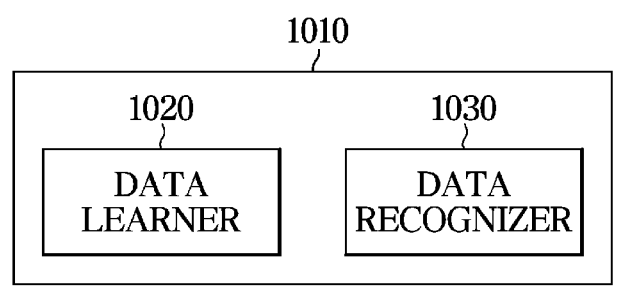
FIG. 10 is a block diagram illustrating an example data learner and an example data recognizer according to an embodiment of the disclosure.

FIG. 10 is a block diagram illustrating an example data learner and an example data recognizer according to an embodiment of the disclosure.

Referring to FIG. 10, a processor 1010 may include a data learner (e.g., including various processing circuitry and/or executable program elements) 1020 and a data recognizer (e.g., including various processing circuitry and/or executable program elements) 1030. The processor 1010 of FIG. 10 may correspond to the processor 210 of the electronic device 10 of FIG. 2 or the data processor 260 of the server 20 of FIG. 2.

According to an embodiment of the disclosure, the data learner 1020 may include various processing circuitry and/or executable program elements and generate or learn a learning model (e.g., the first learning model or the second learning model of FIG. 1) having criterion for determining a predetermined situation. The data learner 1020 may generate the learning model having the determination criterion using collected learning data.

For example, the data learner 1020 may use an A image and a B image as learning data to generate, learn, or update a learning model having criterion for generating a C image resulting from converting the A image into a style of the B image.

The data recognizer 1030 may include various processing circuitry and/or executable program elements and use predetermined data as input data of a learned learning model to acquire (or generate) new data.

For example, the data recognizer 1030 may use a first image and a second image as input data of a learned learning model to acquire (or generate) a third image resulting from converting the first image into a style of the second image.

The learning model (e.g., the first learning model or the second learning model) according to an embodiment of the disclosure may include, for example, a learning model (or an algorithm) for acquiring (or generating) a C image resulting from converting an A image into a style of a B image. A learning method and a frame work of the learning model are not limited.

The learning model may include, for example, and without limitation, "Deep Photo Style Transfer", "A Closed-form Solution to Photorealistic Image Stylization", "Visual Attribute Transfer through Deep Image Analogy", CycleGAn (Generative Adversarial Networks)—"Unpaired Image-to-Image Translation using Cycle-Consistent Adversarial Networks", "Pix2Pix", or the like, based on a neural style.

The learning model may include, for example, and without limitation, TensorFlow, CoreML, Torch, Caffe, or the like, based on a framework.

However, the learning model is not limited to the above-mentioned examples. For example, the learning model according to an embodiment of the disclosure may include, for example, and without limitation, a feature map and learning models generated by any method of defining a feature map that is reflected to content.

According to an embodiment of the disclosure, at least one portion of the data learner 1020 and at least one portion of the data recognizer 1030 may be implemented as a software module, or manufactured in a form of at least one hardware chip and mounted on an electronic device. For example, at least one of the data learner 1020 or the data recognizer 1030 may be manufactured in a form of a dedicated hardware chip for artificial intelligence (AI), or manufactured as a portion of an existing general-purpose processor (e.g., a CPU or an application processor) or a graphic dedicated processor (e.g., a GPU) and mounted on the electronic device 10 or the server 20 as described above. The dedicated hardware chip for AI may be a dedicated processor specialized for stochastic probability, and may quickly process operation tasks of AI fields such as machine learning due to its higher parallel processing performance than the existing general-purpose processor. When the data learner 1020 and the data recognizer 1030 are implemented as a software module (or a program module including instructions), the software module may be stored in non-transitory computer readable media. In this case, the software module may be provided by an operating system (OS) or a predetermined application. Alternatively, a portion of the software module may be provided by an OS, and the other portion of the software module may be provided by a predetermined application.

In this case, the data learner 1020 and the data recognizer 1030 may be mounted on an electronic device or on separate electronic devices, respectively. For example, one of the data learner 1020 and the data recognizer 1030 may be included in the electronic device 10 or the server 20, and the remaining one may be included in external servers. Also, the data learner 1020 may provide information about a model established by itself to the data recognizer 1030 in a wired or wireless fashion, or data input to the data recognizer 1030 may be provided as additional learning data to the data learner 1020.

Figure 11:
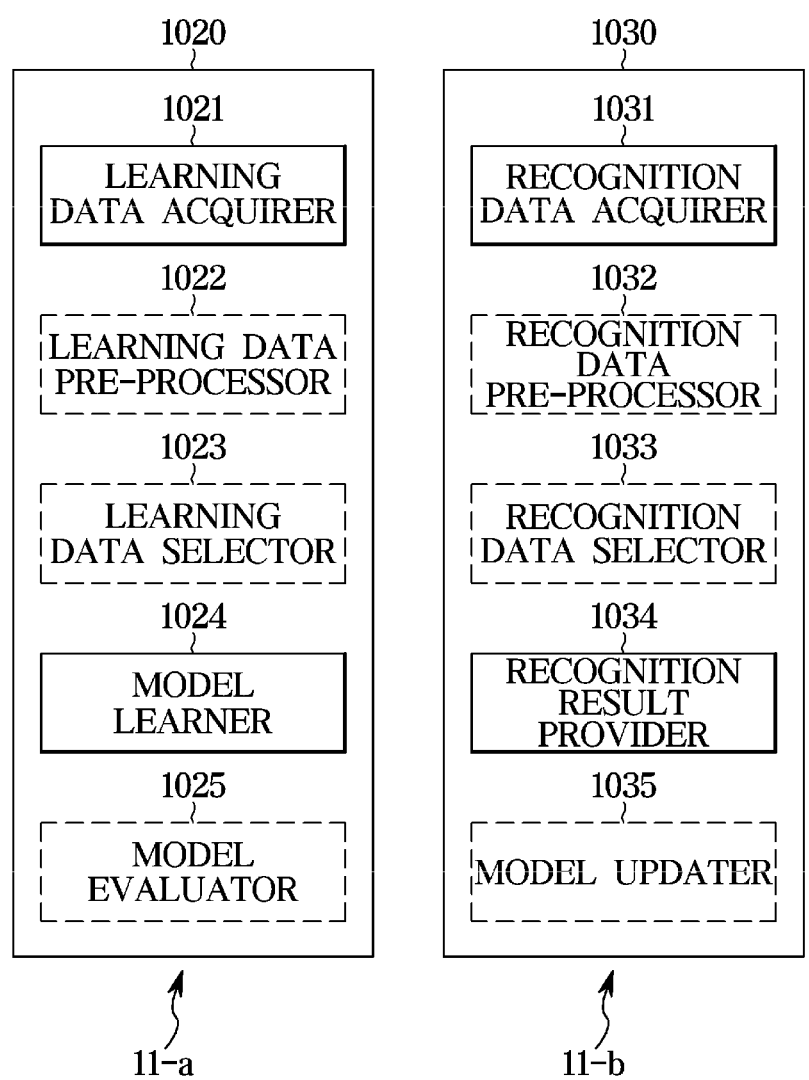
FIG. 11 is a block diagram illustrating an example data learner and an example data recognizer according to various embodiments of the disclosure.

FIG. 11 is a block diagram illustrating an example data learner and an example data recognizer according to various embodiments of the disclosure.

Referring to a reference numeral 11-a of FIG. 11, the data learner 1020 according to an embodiment of the disclosure may include a learning data acquirer (e.g., including various processing circuitry and/or executable program elements) 1021 and a model learner (e.g., including various processing circuitry and/or executable program elements) 1024. Also, the data learner 1020 may selectively further include, for example, at least one of a learning data pre-processor (e.g., including various processing circuitry and/or executable program elements) 1022, a learning data selector (e.g., including various processing circuitry and/or executable program elements) 1023, and/or a model evaluator (e.g., including various processing circuitry and/or executable program elements) 1025.

The learning data acquirer 1021 may include various processing circuitry and/or executable program elements and acquire learning data required for a learning model for image conversion. For example, the learning data acquirer 1021 may acquire an image to be converted and a reference image as learning data. The learning data acquirer 1021 may acquire, as learning data, an acquired image obtained by converting the image to be converted with reference to a style of the reference image.

The model learner 1024 may include various processing circuitry and/or executable program elements and learn a learning model to have determination criterion based on which the learning model determines a predetermined recognition object using the learning data. For example, the model learner 1024 may learn a learning model through supervised learning using at least one portion of the learning data as determination criterion. The model learner 1024 may learn a learning model through unsupervised learning of itself learning using the learning data without being supervised to find determination criterion for determining a situation. The model learner 1024 may learn a learning model through, for example, reinforcement learning using a feedback about whether a result of a situation determination according to learning is correct. The model learner 1024 may learn a learning model using a learning algorithm including, for example, error back-propagation or gradient descent.

The model learner 1024 may learn a learning model to have selection criterion for learning data used to estimate a recognition object using input data.

When a plurality of learning models have been established in advance, the model learner 1024 may determine a learning model having a great relation between input learning data and basic learning data, as a learning model to be learned. In this case, the basic learning data may have been classified in advance according to data types, and the learning models may have been established in advance according to data types. For example, the basic learning data may have been classified in advance according to various criteria, such as regions where learning data has been generated, times at which learning data have been generated, sizes of learning data, genres of learning data, generators of learning data, kinds of objects in learning data, etc.

After the learning model is learned, the model learner 1024 may store the learned learning model. In this case, the model learner 1024 may store the learned learning model in the memory 230 of the electronic device 10. The model learner 1024 may store the learned learning model in a memory of the server 20 connected to the electronic device 10 through a wired or wireless network.

The data learner 1020 may further include the learning data pre-processor 1022 and the learning data selector 1023 to enhance an analysis result of a learning model or save a resource or time required for generating a learning model.

The learning data pre-processor 1022 may include various processing circuitry and/or executable program elements and pre-process the acquired data such that the acquired data is used for learning for a situation determination. The learning data pre-processor 1022 may process the acquired data to a predetermined format such that the model learner 1024 uses the acquired data for learning for a situation determination.

The learning data selector 1023 may include various processing circuitry and/or executable program elements and select data required for learning from among the data acquired by the learning data acquirer 1021 or the data pre-processed by the learning data pre-processor 1022. The selected learning data may be provided to the model learner 1024. The learning data selector 1023 may select learning data required for learning from among the acquired data or the pre-processed data, according to predetermined selection criterion. Also, the learning data selector 1023 may select learning data according to selection criterion set in advance by learning by the model learner 1024.

The data learner 1020 may further include the model evaluator 1025 to enhance an analysis result of the learning model.

The model evaluator 1025 may include various processing circuitry and/or executable program elements and input evaluation data to the learning model, and, when an analysis result output from the evaluation data does not satisfy the predetermined criterion, the model evaluator 1025 may instruct the model learner 1024 to again learn the learning model. In this case, the evaluation data may be pre-defined data for evaluating a learning model.

For example, when a number or rate of evaluation data with incorrect analysis results among analysis results of a learned learning model with respect to evaluation data exceeds a predetermined threshold, the model evaluator 1025 may determine that the evaluation data does not satisfy the predetermined criterion.

When there are a plurality of learned learning models, the model evaluator 1025 may determine whether each learned learning model satisfies the predetermined criterion, and determine a learning model satisfying the predetermined criterion as a final learning model. In this case, when there are a plurality of learning models satisfying the predetermined criterion, the model evaluator 1025 may determine a predetermined learning model or a predetermined number of learning models in high order of evaluation scores, as a final learning model.

Referring to a reference numeral 11-*b* of FIG. 11, the data recognizer 1030 according to an embodiment of the disclosure may include a recognition data acquirer (e.g., including various processing circuitry and/or executable program elements) 1031 and a recognition result provider (e.g., including various processing circuitry and/or executable program elements) 1034.

Also, the data recognizer 1030 may selectively further include, for example, at least one of a recognition data pre-processor (e.g., including various processing circuitry and/or executable program elements) 1032, a recognition data selector (e.g., including various processing circuitry and/or executable program elements) 1033, and/or a model updater (e.g., including various processing circuitry and/or executable program elements) 1035.

The recognition data acquirer 1031 may include various processing circuitry and/or executable program elements and acquire data required for a situation determination. The recognition result provider 1034 may include various processing circuitry and/or executable program elements and apply the data acquired by the recognition data acquirer 1031 as an input value to a learned learning model to determine a situation. The recognition result provider 1034 may provide an analysis result according to an analysis purpose of data. The recognition result provider 1034 may apply data selected by the recognition data pre-processor 1032 or the recognition data selector 1033, which will be described in greater detail below, as an input value, to a learning model to acquire an analysis result. The analysis result may be determined by the learning model.

According to an embodiment of the disclosure, the recognition result provider 1034 may apply an image to be converted, acquired by the recognition data acquirer 1031, and a reference image to a learned learning model to acquire (or generate) an acquired image resulting from converting the image to be converted into a style of the reference image.

The data recognizer 1030 may further include the recognition data pre-processor 1032 and the recognition data selector 1033 to enhance an analysis result of a learning model or save a resource or time for providing an analysis result.

The recognition data pre-processor 1032 may include various processing circuitry and/or executable program elements and pre-process the acquired data such that the acquired data is used for a situation determination. The recognition data pre-processor 1032 may process the acquired data to a pre-defined format such that the recognition result provider 1034 uses the acquired data for a situation determination.

The recognition data selector 1033 may include various processing circuitry and/or executable program elements and select data required for a situation determination from among the data acquired by the recognition data acquirer 1031 or the data pre-processed by the recognition data pre-processor 1032. The selected data may be provided to the recognition result provider 1034. The recognition data selector 1033 may select the entire or a portion of the acquired data or the pre-processed data according to pre-set selection criterion for a situation determination. Also, the recognition data selector 1033 may select data according to selection criterion set in advance by learning by the model learner 1024.

The model updater 1035 may include various processing circuitry and/or executable program elements and control update of a learning model based on evaluation on an analysis result provided by the recognition result provider 1034. For example, the model updater 1035 may provide an analysis result provided by the recognition result provider 1034 to the model learner 1024 to request the model learner 1024 to additionally learn or update a learning model.

Figure 12:
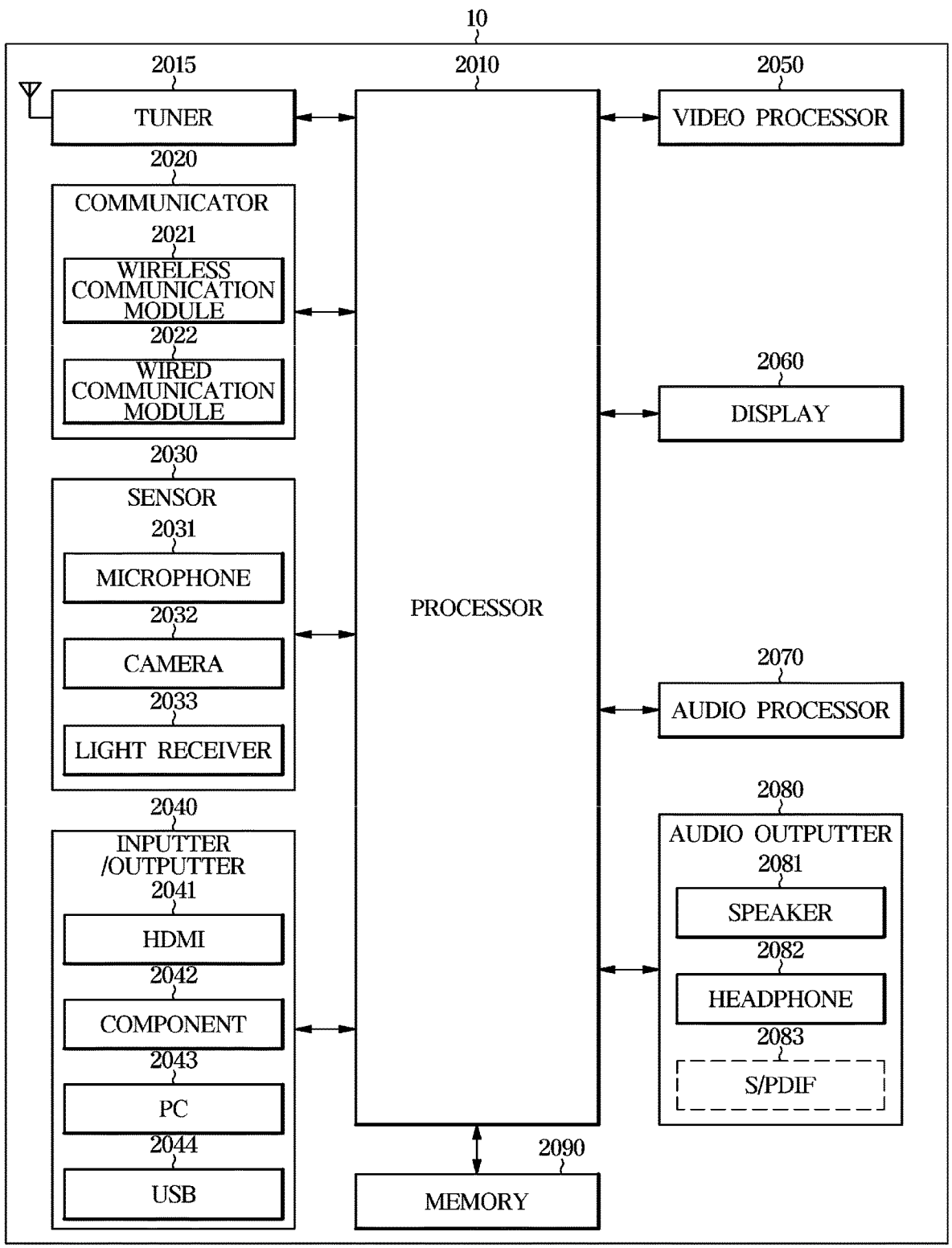
FIG. 12 is a block diagram illustrating an example electronic device according to various embodiments of the disclosure.

FIG. 12 is a block diagram illustrating an example electronic device according to various embodiments of the disclosure.

As shown in FIG. 12, the electronic device 10 may further include at least one of a memory 2090, a tuner 2015, a sensor 2030, an inputter/outputter (e.g., including input/output circuitry) 2040, a video processor (e.g., including video processing circuitry) 2050, an audio processor (e.g., including audio processing circuitry) 2070, and/or an audio outputter (e.g., including audio output circuitry) 2080, in addition to a processor (e.g., including processing circuitry) 2010, a communicator (e.g., including communication circuitry) 2020, and a display 2060.

The processor 2010, the communicator 2020, the memory 2090, and the display 2060 of FIG. 12 may respectively correspond to the processor 210, the communicator 220, the memory 230, and the display 240 of FIG. 2.

The processor 2010 may include various processing circuitry and execute software (e.g., a program) stored in the memory 2090 to control at least another component (e.g., a hardware or software component) of the electronic device 10 connected to the processor 2010, and perform various data processing or operations. According to an embodiment of the disclosure, as at least one portion of the data processing or operations, the processor 2010 may load a command or data received from another component in the memory (e.g., a volatile memory) 2090, process the command or data stored in the memory 2090, and store resultant data in a memory (e.g., a non-volatile memory). According to an embodiment of the disclosure, the processor 2010 may include, for example, and without limitation, a main processor (e.g., a CPU or an application processor), and a coprocessor (e.g., a graphic processor, an image signal processor, a sensor hub processor, a communication processor), or the like, that may operate independently from the main processor or together with the main processor. Additionally or alternatively, the coprocessor may be configured to use lower power than the main processor or be specialized for a designated function. The coprocessor may be separated from the main processor or integrated into the main processor. The coprocessor may control at least one portion of functions or states related to at least one component of components of the electronic device 10, by replacing the main processor when the main processor is in an inactive state (e.g., a slip state) or operating together with the main processor when the main processor is in an active state (e.g., an application execution state).

The communicator 2020 may include various communication circuitry and connect the electronic device 10 to an external device or the server 20 under control of the processor 2010. The communicator 2020 may operate independently from the processor 2010 (e.g., an application processor), and include at least one communication processor supporting direct communication (e.g., wired communication) or wireless communication. According to an embodiment of the disclosure, the communicator 2020 may include a wireless communication module including various wireless communication circuitry (e.g., a cellular communication module, a short-range communication module, or a global navigation satellite system (GNSS) communication module) 2021 and/or a wired communication module including various wired communication circuitry (e.g., a local area network (LAN) communication module or a power line communication module) 2022. A corresponding communication module among the communication modules may communicate with the server 20 through a first network (e.g., a short-range communication network, such as Bluetooth, WiFi Direct, or Infrared data association (IrDA)) or a second network (e.g., a long-range communication network, such as a cellular network, the Internet, or a computer network (e.g., a LAN or a wide area network (WAN)). The kinds of communication modules may be integrated into a single component (e.g., a single chip) or implemented with a plurality of components (e.g., a plurality of chips).

The display 2060 may provide visual information (e.g., a user interface (UI)) to outside of the electronic device 10. When the display 2060 forms a layered structure with a touch pad to be configured as a touch screen, the display 2060 may be used as an inputter as well as an outputter. The display 2060 may include, for example, and without limitation, at least one of a liquid crystal display (LCD), a thin film transistor-liquid crystal display (TFT-LCD), an organic light-emitting diode (OLED) display, a flexible display, a 3dimensional (3D) display, an electrophoretic display, or the like. Also, according to an implementation type of the electronic device 10, the electronic device 10 may include two or more displays 2060.

The tuner 2015 may tune and select a frequency of a channel that the electronic device 10 wants to receive from among many radio wave components through amplification, mixing, and resonance of broadcast signals received in a wired or wireless manner. The broadcast signals may include audio, video, and additional information (e.g., electronic program guide (EPG)).

The broadcast signals received through the tuner 2015 may be subject to decoding (e.g., audio decoding, video decoding or additional information decoding) to be split into audio, video, and/or additional information. The audio, video, and/or additional information may be stored in the memory 2090 under control of the processor 2010. The electronic device 10 may include one or more tuners. The tuner 2015 and the electronic device 10 may be all in one. Also, the tuner 2015 may be implemented as a separate device having a tuner electrically connected to the electronic device 10 or as a tuner (not shown) connected to the inputter/outputter 2040.

The sensor 2030 may sense a user's voice, a user's image, or a user's interaction, and may include, for example, and without limitation, a microphone 2031, a camera 2032, and a light receiver 2033, or the like.

The microphone 2031 may receive a voice uttered from a user. The microphone 2031 may convert the received voice into an electrical signal, and output the electrical signal to the processor 2010. The camera 2032 may receive an image (e.g., successive frames) corresponding to a user's motion including a gesture in a camera recognition range. The light receiver 2033 may receive an optical signal (including a control signal) from an external controller (e.g., a remote controller). The light receiver 2033 may receive an optical signal corresponding to a user input (e.g., a touch, pressing, a touch gesture, a voice, or a motion) from the external controller. An optical signal may be extracted from the optical signal by a control of the processor 2010.

The inputter/outputter 2040 may include various input/output circuitry and receive video (e.g., a moving image), audio (e.g., a voice, music, etc.), and additional information (e.g., EPG, etc.) from the outside of the electronic device 10 by a control of the processor 2010. The inputter/outputter 2040 may, for example, and without limitation, include at least one of a high-definition multimedia interface (HDMI) port 2041, a component jack 2042, a PC port 2043, and a universal serial bus (USB) port 2044. The inputter/outputter 2040 may include a combination of the HDMI port 2041, the component jack 2042, the PC port 2043, and the USB port 2044.

The video processor 2050 may include various video processing circuitry and process an image to be displayed by the display 2060, and perform various image processing, such as decoding, scaling, noise filtering, frame rate conversion, and resolution conversion, on video data.

The audio processor 2070 may include various audio processing circuitry and perform processing on audio data. The audio processor 2070 may perform various processing, such as decoding, amplification, and noise filtering, on audio data.

The audio outputter 2080 may include various audio output circuitry and output audio included in a broadcast signal received through the tuner 2015, audio received through the communicator 2020 or the inputter/outputter 2040, and audio stored in the memory 2090 by a control of the processor 2010. The audio outputter 2080 may include at least one of a speaker 2081, a head phone output terminal 2082, or Sony/Philips Digital Interface (S/PDIF) 2083.

The memory 2090 according to an embodiment of the disclosure may store programs for processing and control of the processor 2010, and data input to the electronic device 10 or data to be output from the electronic device 10.

The memory 2090 may be at least one kind of storage medium among a flash memory type, a hard disk type, a multimedia card micro type, a card type memory (e.g., Secure Digital (SD) memory or eXtreme Digital (XD) memory), Random Access Memory (RAM), Static Random Access Memory (SRAM), Read-Only Memory (ROM), Electrically Erasable Programmable Read-Only Memory (EEPROM), Programmable Read-Only Memory (PROM), a magnetic memory, a magnetic disk, or an optical disk.

Various embodiments of the disclosure may be implemented as software including one or more instructions stored in a storage medium (e.g., the memory 2090) that is readable by a machine (e.g., the electronic device 10). For example, a processor (e.g., the processor 2010) of the machine (e.g., the electronic device 10) may invoke at least one of the one or more instructions stored in the storage medium, and execute the instruction to allow the machine to be operated to perform at least one function according to the at least one instruction invoked. The one or more instructions may include a code generated by a complier or a code executable by an interpreter. The machine-readable storage medium may be provided in the form of a non-transitory storage medium, wherein the 'non-transitory' the storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloadable or uploadable) online via an application store (e.g., Play Store™) or between two user devices (e.g., smart phones) directly. When distributed online, at least part of the computer program product may be temporarily generated or at least temporarily stored in the machine-readable storage medium, such as a memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components or one or more of the above-described operations may be omitted, or one or more other components or one or more other operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or mitted, or one or more other operations may be added.

As described above, according to an embodiment of the disclosure, the electronic device may temporally efficiently convert an image to provide a new image using one of a plurality of image conversion learning models including an image conversion learning model included in the electronic device and an image conversion learning model located at outside, in consideration of a feature of the image.

According to an embodiment of the disclosure, when there are a plurality of images that are to be converted, the electronic device may determine a learning model for converting the images in consideration of features of the images to provide a plurality of new images.

According to an embodiment of the disclosure, the electronic device may provide information about times taken for a plurality of image conversion learning models to convert an image.

While the disclosure has been illustrated and described with reference to various example embodiments, the example embodiments are intended to be illustrative, not limiting. It will be appreciated by those skilled in the art that various changes in form and detail may be made without departing from the spirit and scope of the disclosure, including the claims and their equivalents.

What is claimed is:

1. An electronic device comprising:
   a communicator comprising communication circuitry configured to establish communication with an external device;
   a display configured to display a first image and a second image;
   a processor; and
   a memory,
   wherein the memory stores instructions configured, when executed, to cause the processor to control the electronic device to:
   acquire a feature of the first image and a feature of the second image;
   acquire a first time expected to acquire a third image using a first learning model included in the electronic device and a second time expected to acquire the third image using a second learning model included in a server in communication with the electronic device through the communicator, wherein the first learning model and the second learning model are configured to convert the first image into a style of the second image to acquire the third image;
   identify a learning model to be applied to the first image and the second image from among the first learning model and the second learning model, based on at least one of the feature of the first image, the feature of the second image, the first time or the second time; and
   control the display to display the first time and the second time.

2. The electronic device of claim 1, wherein the plurality of instructions, when executed, further cause the processor to control the display to display the third image acquired using the first learning model or the second learning model.

3. The electronic device of claim 1, wherein the feature of the first image or the feature of the second image includes at least one of a data size of the first image or a data size of the second image, a resolution of the first image or a resolution of the second image, a type of the first image or a type of the second image, or a number of selected images.

4. The electronic device of claim 1, wherein the first learning model and the second learning model are further configured to convert the first image into the style of the second image using at least one of a color value, a saturation value, or a brightness value of the second image to acquire the third image.

5. The electronic device of claim 1, wherein the plurality of instructions, when executed, further cause the processor to control the display to display a plurality of images including the first image and the second image, and identify the learning model to be applied to the first image and the second image based on an input selecting the first image and the second image.

6. The electronic device of claim 1, wherein the plurality of instructions, when executed, further cause the processor to control the electronic device to:
identify, based on there being a plurality of first images, a learning model to be applied to the plurality of first images and the second image based on features acquired from the plurality of first images.

7. The electronic device of claim 1, wherein the plurality of instructions, when executed, further cause the processor to control, based on the processor identifying the second learning model as the learning model to be applied to the first image and the second image, the communicator to transmit the first image and the second image to the server.

8. The electronic device of claim 1, wherein the plurality of instructions, when executed, further cause the processor to control the electronic device to: determine the learning model to be applied to the first image and the second image based on an input selecting one of the first time and the second time displayed on the display.

9. The electronic device of claim 1, wherein the plurality of instructions, when executed, further cause the processor to identify, based on the processor identifying that at least one of the first image or the second image has been stored in advance in the server, the second learning model included in the server as the learning model to be applied to the first image and the second image.

10. A method of controlling an electronic device, comprising:
acquiring a feature of a first image and a feature of a second image, the first image and the second image being displayed on a display;
acquiring a first time expected to acquire a third image using a first learning model included in the electronic device and a second time expected to acquire the third image using a second learning model included in a server in communication with the electronic device, wherein the first learning model and the second learning model are configured to convert the first image into a style of the second image to acquire the third image;
identifying a learning model to be applied to the first image and the second image from among the first learning model and the second learning model, based on at least one of the feature of the first image, the feature of the second image, the first time or the second time; and
displaying the first time and the second time on the display.

11. The method of claim 10, further comprising displaying the third image acquired using the first learning model or the second learning model on the display.

12. The method of claim 10, wherein the feature of the first image or the feature of the second image includes at least one of a data size of the first image or a data size of the second image, a resolution of the first image or a resolution of the second image, a type of the first image or a type of the second image, or a number of selected images.

13. The method of claim 10, further comprising:
displaying a plurality of images including the first image and the second image on the display; and
identifying the learning model to be applied to the first image and the second image based on an input selecting the first image and the second image.

14. The method of claim 10, further comprising identifying, based on there being a plurality of first images, the learning model to be applied to the plurality of first images and the second image based on features acquired from the plurality of first images.

15. The method of claim 10, further comprising transmitting, based on the second learning model being identified as the learning model to be applied to the first image and the second image, the first image and the second image to the server.

16. The method of claim 10, further comprising determining the learning model to be applied to the first image and the second image based on an input selecting one of the first time and the second time displayed on the display.

17. The method of claim 10, further comprising identifying, based on it being identified that at least one of the first image or the second image has been stored in advance in the server, the second learning model included in the server as the learning model to be applied to the first image and the second image.

18. A computer program product comprising a non-transitory computer-readable recording medium having stored thereon a plurality of instructions which, when executed on a computer, cause an electronic device to perform operations comprising:
acquiring a feature of a first image and a feature of a second image, the first image and the second image being displayed on a display;
acquiring a first time expected to acquire a third image using a first learning model included in the electronic device and a second time expected to acquire the third image using a second learning model included in a server in communication with the electronic device, wherein the first learning model and the second learning model are configured to convert the first image into a style of the second image to acquire the third image;
identifying a learning model to be applied to the first image and the second image from among the first learning model and the second learning model, based on at least one of the feature of the first image the feature of the second image, the first time or the second time; and
control the display to display the first time and the second time.

* * * * *